Jan. 15, 1935.  G. A. KRAUSE  1,988,246
PROCESS FOR THE STERILIZATION OF LIQUIDS
Filed July 25, 1929  2 Sheets-Sheet 1
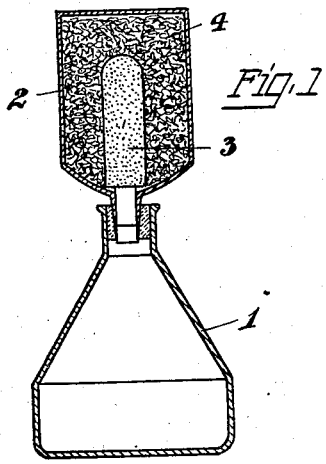
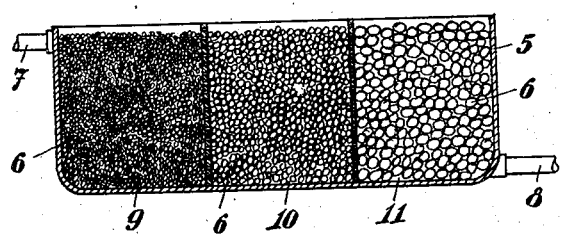
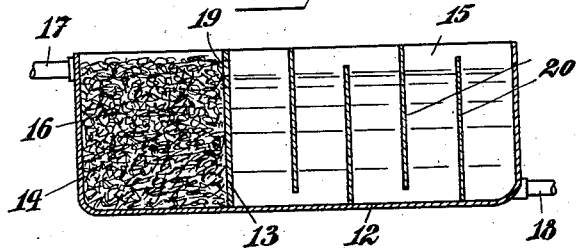
INVENTOR
Georg Alexander Krause
By
ATTORNEYS Jan. 15, 1935.  G. A. KRAUSE  1,988,246
PROCESS FOR THE STERILIZATION OF LIQUIDS
Filed July 25, 1929  2 Sheets-Sheet 2
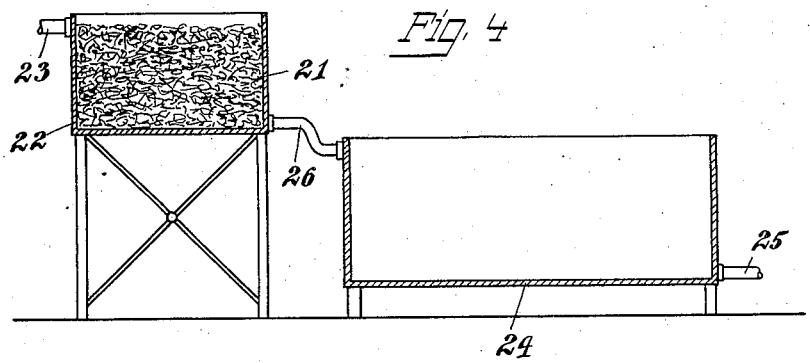
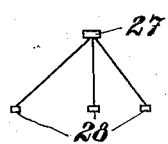
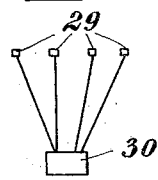
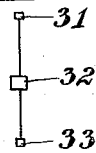
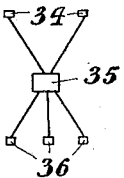
INVENTOR
Georg Alexander Krause
By
ATTORNEYS Patented Jan. 15, 1935

1,988,246

UNITED STATES PATENT OFFICE 1,988,246

PROCESS FOR THE STERILIZATION OF LIQUIDS

Georg Alexander Krause, Munich, Germany, assignor to Katadyn, Inc., Dover, Del., a corporation of Delaware Application July 25, 1929, Serial No. 380,901
In Germany August 2, 1928

7 Claims. (Cl. 99—15)

This invention relates to a process for the complete or partial sterilization of liquids by bringing them into contact with metals or metal compounds having an oligodynamic action; and aims at enabling the sterilization of the liquids to be carried out whilst employing smaller amounts of oligodynamically active substance than were hitherto required.

Processes of sterilizing liquids are already known in which metals or metal compounds having an oligodynamic action are employed. These known processes are carried out by bringing the liquids to be sterilized into contact with the oligodynamically active substances and leaving them in contact therewith until the said liquids become sterile. Since metals and metal compounds of the heavy metal group, inter alia also copper, antimony and the precious metals, silver, silver oxide, gold, iridium, thallium and others are employed with advantage for oligodynamic sterilization, the installation costs for oligodynamic sterilizers constructed with these metals are very high, especially in the case of installations dealing with large amounts of liquid to be sterilized.

It has now been found that any desired amounts of liquid can with certainty be sterilized or partially sterilized to the required degree whilst using much smaller amounts of oligodynamically active metals than has hitherto been the case, by interrupting the contact between the liquids to be sterilized and the oligodynamically active substances prior to the complete sterilization; this preliminary sterilization being followed by a final sterilization which may, if desired, be of a multistage character.

It has in fact been ascertained that the partially sterilized liquids are automatically further sterilized without subsequent contact with oligodynamic substance. The final sterilization following the preliminary sterilization can therefore be effected by the auto-sterilization of the preliminarily sterilized liquids, for example by merely allowing the preliminarily sterilized liquids to stand. The final sterilization may however also be effected by a contact which may, if desired, be of a multistage character, between the preliminarily sterilized liquid and oligodynamically active substances of less efficiency or coarser consistency alternatively with smaller amounts of oligodynamically active substances than are employed in the preliminary sterilization and if desired by means of a subsequent or intermediate auto-sterilization. The complete sterilization process is thus terminated within a shorter or longer period according to the intensity of the initial treatment.

Instead of following the preliminary sterilization with a single or multi-stage final sterilization with oligodynamically active substances of coarser consistency or less effectiveness or in smaller amounts than employed for the preliminary sterilization it is also possible when necessitated by special circumstances to follow the preliminary sterilization by a single or multi-stage final sterilization by means of oligodynamically active substance of a greater effectiveness or in a finer state of division or in larger amounts than employed for the preliminary sterilization and on occasion with a subsequent or intermediate auto-sterilization. It is also possible to add non-sterile untreated liquid to liquid which has been preliminarily or completely sterilized in accordance with the invention, which is then finally sterilized together with the preliminarily sterilized liquid.

Numerous types of apparatus are suitable for carrying out the process of the present invention, provided that the same allow of a division of the sterilization into at least two stages, namely, a preliminary sterilization and a final sterilization or into more than two stages, namely preliminary sterilization, intermediate sterilization, carried out on occasion in several stages, and final sterilization. Thus, for example, the process may be carried out in at least two sterilizing chambers arranged in series which are furnished with oligodynamically active substance of different degrees of effectiveness which can be for example, of greater or lesser intensity or with oligodynamically active substances of the same degree of intensive action but which are in different states of subdivision for example, graduated coarser or finer division. The chambers may also be provided with varying amounts i. e. smaller or larger, amounts of oligodynamically active substance. If desired, one or more of the sterilizing chambers subsequent to the first sterilizing chamber—for example, the last sterilizing chamber—may serve for the auto-sterilization of the liquid which has already come into contact with oligodynamically active substance and which is free from oligodynamically active substances.

In these arrangements, one or more of the sterilizing chambers arranged in series, may be multiplied and arranged in parallel. Similarly, oligodynamically active substances may be present in one or more of the sterilizing chambers in graduated amounts or in a state of graduated subdivision or in amounts having a graduated effect. It is also possible however, to carry out the operation by effecting the sterilization in a single sterilizing chamber which is provided with oligodynamically active substance in a state of graduated division or in graduated amounts or in amounts having a graduated action so that all the individual sterilizing stages obtain in a single sterilizing chamber.

The sterilization process of the present invention may be carried out in a continuous, intermittent or semi-continuous manner; thus for example, the preliminary sterilizer and the final sterilizer may operate discontinuously or the preliminary sterilizer may operate continuously whilst the final sterilizer operates discontinuously or vice versa.

Moreover a preliminary sterilizer may co-operate with several final sterilizers or several preliminary sterilizers may co-operate with one final sterilizer and the like. Moreover the same liquid may be caused to run several times through the same preliminary sterilizer or final sterilizer or through both before it is conducted further. It is essential in carrying out the invention that the liquid to be treated leaves the preliminary sterilizing stage before it has reached the desired degree of sterilization whereupon it is subjected to a final sterilization which may be effected or aided by the auto-sterilization of the liquid issuing from the preliminary sterilizing stage.

Since, as is well known, the sterilization of liquids by bringing same into contact with oligodynamically active substances can be controlled selectively, it is possible for example, to kill off all the pathogenic micro-organisms by the preliminary sterilization and, if a completely sterile liquid is to be obtained, to remove the still living micro-organisms by the final sterilization.

It is also however sufficient if only a part of the pathogenic micro-organisms are killed off by the preliminary sterilization and all the pathogenic micro-organisms are killed off by the final sterilization, whereas harmless spores may still remain alive in cases where it is necessary to remove from the liquid only the pathogenic spores.

Similarly the oligodynamic sterilization can be influenced or controlled in known manner by agitating the liquid or blowing in air or other gases as well as by adjusting the temperature in any one or in all of the sterilizing stages. Moreover the liquid may be exposed to light or radiation, or subjected to the influence of electric currents, in any one stage during, before or after the sterilization.

Similarly the liquids may be subjected to a filtration which may be effected before the sterilization, between the individual sterilizing stages or after sterilization.

In order more clearly to understand the invention, reference is made to the accompanying drawings which illustrate diagrammatically and by way of example, several apparatuses suitable for carrying the invention into practical effect.

In said drawings:—

Fig. 1 illustrates a drop-filter constructed in accordance with the invention;

Fig. 2 shows a sterilizing installation having a single sterilizing chamber for the multi-stage sterilization;

Fig. 3 shows a sterilizing installation comprising a container which is divided into two separate sterilizing chambers.

Fig. 4 shows a sterilizing installation comprising two separate sterilizing chambers arranged in separate containers.

Figs. 5a, b, c and d are diagrammatic layouts of different types of sterilizing installations.

The drop-filter illustrated in Fig. 1, consists of a container 1 with a superimposed funnel 2 which is provided with a filter candle 3. The funnel 2 is filled with oligodynamically active substance 4, for example with silver, copper, silver oxide or the like precipitated on asbestos, clay chips or the like.

As is well known, the filter candle 2 allows bacteria contained in the liquid to be treated, (for example impure water) to sprout through the filter after a short time. Since however the liquid has been preliminarily treated by contact with the oligodynamically active substance 4, the filtrate is completely sterilized by auto-sterilization after standing for some time in the vessel 1.

The sterilizing installation illustrated in Fig. 2 comprises a single container 5 filled with Raschig rings 6 of different size which are provided with coatings of oligodynamically active substance for example, silver, iridium, or the like, for example by means of the metal spraying process.

Between the inlet 7 for the liquid to be sterilized and the outlet 8 the sterilizing chamber is divided into three stages 9, 10 and 11 insofar as larger or smaller Raschig rings or thinner or thicker metal coatings or more active or less active oligodynamically active substance such as for example, amorphous silver, a mixture of amorphous and crystalline silver and crystalline silver being employed.

Fig. 3 shows a container 12 which is divided by a partition 13 into two sterilizing chambers 14 and 15. The sterilizing chamber 14 is filled with oligodynamically active substance 16, which may consist for example, of rustless steel or silver which is spread on suitable carriers, such as for example, Bolus or the like. The throughput speed of the liquid which is to be treated entering at 17 and running over the overflow 19 from the chamber 14 into the chamber 15 which may be provided with partitions 20, before it runs out through the outlet 18 is so controlled that on leaving said outlet the liquid possesses the desired degree of sterilization. Similarly, the amount of oligodynamically active filling substance 16 in the chamber 14 is so adjusted to the nature of the liquid to be treated that the latter is oligodynamically treated with sufficient intensity to ensure that the final sterilization is terminated on passing through the chamber 15. It is moreover possible to adjust the relative capacities of the chambers 14 and 15 to the amount of the liquid and to the type of oligodynamically active substance employed by displacing the partition 13.

Fig. 4 illustrates an embodiment of an apparatus comprising a preliminary sterilizer 22 which is partially or completely filled with oligodynamically active metals 21, such as for example silver, copper, silver-copper alloy spread on carriers, such as quartz sand, and which is if desired, of a multi-stage type, (Fig. 2) and which is provided with inlet 23. Said preliminary sterilizer 22 is separated from the final sterilizer 24 having an outlet 25 for the treated liquid. The preliminary sterilizer and the final sterilizer may operate either continuously or intermittently in the same way either one of the two sterilizers which are connected together by conduit 26 provided if desired, with closure valve, may operate continuously or intermittently.

The system of connections illustrated in Fig. 5 a shows a preliminary sterilizer 27 which is connected with three final sterilizers 28. Fig. 5b shows four preliminary sterilizers 29 combined with a single final sterilizer 30. Fig. 5c shows a preliminary sterilizer 31 which is connected with a final sterilizer 33 by way of an intermediate stage 32. Fig. 5d shows two preliminary sterilizers 34 which are connected by way of an intermediate stage 35 with three final sterilizers 36. Any desired number of further systems of connections may be made in a similar manner.

*Example I*

300 grams of quartz sand are coated with 30 grams of silver by wetting same with a silver nitrate solution and thereupon heating in a muffle furnace at 400° C. The quartz sand is placed in a suction-filter and 5 litres of water are passed therethrough per minute. The water is inoculated with half a million of the *Bacilli coli communis* per cubic cm. The water issuing from the filter which does not completely filter out the bacteria, still contains 15,000 bacilli per cubic cm. The water is thereupon left to stand in a container in which no oligodynamically active metals are present and after 10 hours complete sterility has ensued.

Example II

Beer containing an abundance of aerated yeast is drawn through the above described filter. The beer still contains after treatment, a certain number of yeast cells which is however reduced. The treatment has nevertheless been sufficient to kill these yeast cells after the beer has been left to stand for two days in a vessel which contains no further quantities of oligodynamic metals.

Example III

Water containing 2,000 of the *Bacilli coli communis* per cubic cm. was drawn through copper filings at a rate of 500 cubic cm. per minute. The water which had been thus treated contains only 400 bacilli per cubic cm. After the water had been left to stand in a vessel containing no copper it was found on testing same 12 hours after the water had passed through the filter, that it no longer contained any *Bacilli coli communis*.

Example IV

If it were intended to sterilize water containing the same number of bacilli per unit volume as in Example I completely during the contact with silver, it would be necessary to use about 5 grams of silver per litre of water. The duration of contact would amount to between 4 to 5 hours. Consequently the amount of silver to be prepared for the treatment of 1500 litres of water would be 7,500 grams of silver which would have to remain in contact with the water for 5 hours.

The same amount of water could be preliminarily sterilized within the same period with 30 grams of silver in accordance with Example I to such an extent that it would be completely auto-sterilized within about 10 hours.

Consequently, when operating in accordance with the invention with 30 grams of silver the same effect can be obtained as when operating according to known methods with 7,500 grams.

What I claim is:

1. The method of oligodynamic sterilization of liquids, which comprises dividing the sterilization into two periods and during the first period contacting the liquid with a relatively small amount of oligodynamically active material for a period of time to effect incomplete sterilization of the liquid, and during the second period holding the liquid out of contact with the oligodynamically active material until the liquid has become completely sterilized.

2. The method of oligodynamic sterilization which comprises passing a liquid to be sterilized through a sterilizing chamber containing less than one-half the amount of oligodynamically active material necessary to effect complete sterilization of the liquid during the period of contact with the oligodynamic material, and storing said liquid before use for a period of time sufficient to permit it to become completely sterilized by auto-sterilization.

3. The method of oligodynamic sterilization which comprises contacting a liquid to be sterilized with an amount of oligodynamically active material which is less than one-half the amount which will be used to give complete sterility to the liquid during the period of contact permitted, subsequently contacting the liquid with other oligodynamically active material, the two bodies of oligodynamically active material being insufficient to give complete sterility to the liquid during the period of contact permitted, and permitting a period of time to elapse before using the liquid to complete the sterilization by auto-sterilization.

4. The process of sterilizing liquids which comprises initially contacting the liquid to be sterilized with an oligodynamically active element insufficient in amount to effect the final desired degree of sterilization during the period of contact, subsequently contacting said liquid with an oligodynamically active material having a less activity than the activity of the original material and subsequently permitting the liquid to stand to complete sterilization of the liquid by auto-sterilization.

5. A process for sterilizing liquids which comprises the steps of preliminarily contacting said liquids with an amount of oligodynamically active elements to cause incomplete sterilization and subsequently contacting said liquid with a more active oligodynamic substance than employed in the preliminary sterilization, the quantity of oligodynamically active element in the first step being less than the amount of the second step, and the amount of oligodynamically active substance in the second step being less than sufficient to effect the complete sterilization during the period of contact.

6. In the sterilization of liquids to a predetermined degree with oligodynamically active material the improvement comprising effecting the said sterilization in at least two stages including an initial partial sterilization in the presence of and by contact with a body of oligodynamically active material and a subsequent auto-sterilization in the absence of said body of material, whereby the said predetermined degree of sterilization is accomplished, the sterilization accomplished by contact of the liquid with oligodynamic material being insufficient to accomplish the predetermined degree of sterilization.

7. The method of oligodynamic sterilization which comprises passing a liquid to be sterilized through a sterilizing chamber containing less than one-half the amount of oligodynamically active material necessary to effect complete sterilization of the liquid during the period of contact with the oligodynamic material, and storing said liquid in contact with a relatively small amount of oligodynamically active metal until the liquid becomes completely sterilized, the amount of oligodynamically active metal utilized in the final storage period being insufficient, during its period of contact with the liquid, to contribute appreciably to the increase in sterility of the liquid, the completion of the sterility being attributable essentially to autosterilization effected by lapse of time.

GEORG ALEXANDER KRAUSE.